United States Patent [19]

Van Der Ploeg et al.

[11] Patent Number: 4,834,053

[45] Date of Patent: May 30, 1989

[54] INTERNAL COMBUSTION ENGINE

[75] Inventors: Arie Van Der Ploeg, Wierden; Gustaaf L. Van Wechem, Rijssen; Benjamin C. W. Dull, Deventer, all of Netherlands

[73] Assignee: Texas Instruments Incorporated, Dallas, Tex.

[21] Appl. No.: 115,670

[22] Filed: Nov. 2, 1987

[30] Foreign Application Priority Data

Nov. 3, 1986 [NL] Netherlands .................... 8602782

[51] Int. Cl.$^4$ .................... F02M 31/00; F02M 31/12
[52] U.S. Cl. .................... 123/549; 123/547
[58] Field of Search ............ 123/557, 549, 547

[56] References Cited

U.S. PATENT DOCUMENTS

| 4,325,344 | 4/1982 | Igashira et al. | 123/549 |
| 4,366,798 | 1/1983 | Goto et al. | 123/549 |
| 4,387,291 | 6/1983 | Keppel | 123/549 |
| 4,419,564 | 12/1983 | Marcoux | 123/549 |
| 4,489,232 | 12/1984 | Wada et al. | 123/549 |
| 4,717,808 | 1/1988 | Cyll et al. | 123/549 |

FOREIGN PATENT DOCUMENTS 0248503 12/1987 European Pat. Off. ............ 123/549

Primary Examiner—Willis R. Wolfe
Assistant Examiner—M. Macy
Attorney, Agent, or Firm—John A. Haug; James P. McAndrews; Melvin Sharp

[57] ABSTRACT

An internal combustion engine is provided with a heat sink 6 with thermistor pellets 10, 22, 32 of PTC material. This heat sink is held in position inside a through passage for the fuel mixture through the action of clamp means 14; 17; 23; 33 which press the heat sink against the inside surface of the through passage. Obviously the heat sink is electrically insulated with respect to the engine. Advantages are that no plastics contact carrier and an opening in the wall of the manifold are needed and that the temperature peak is moved from the unloaded side towards the middle of the thickness of the thermistor pellets.

17 Claims, 4 Drawing Sheets

INTERNAL COMBUSTION ENGINE

The invention relates to an internal combustion engine provided with at least one heating means for heating fuel mixture, which means consists of a metal disc (heat sink) on which one or more thermistor pellets made of material having a positive temperature coefficient (PTC) of resistivity are fastened, while means are provided for supplying electric current to said thermistor pellets and for taking off electric current from the latter.

The fuel mixture introduced is distributed via the inlet manifold as uniformly as possible over the cylinders of the internal combustion engine, while a contribution is also made to the evaporation of the fuel. The uniformity of the distribution is dependent, among other factors, on the extent to which the fuel is evaporated. Particularly when the engine is cold, this evaporation leaves much to be desired. Use is therefore made of a heating means in which a so-called hot spot is formed. Through the application of an electric voltage through the PTC material, heat is generated. At a determined temperature the electrical resistance of the pellets will be so great that no further temperature rise will occur. The electric circuit of the thermistor pellets may contain a thermal switch or a thermostat operated relay. The thermostat is controlled by a temperature sensor, which for example measures the temperature of the engine cooling water and switches off electric current supply to the PTC pellets when a determined temperature (for example 55° C.) is reached. It is also possible for the PTC pellets to be continuously supplied with electric current while the engine is running.

It is known to provide or to form in the inlet manifold a separate opening in which the heating means is disposed. If the heat sink itself is fastened on the inlet manifold, a relatively large amount of heat (for example up to about 25%) may be lost through the connection means (for example fastening lugs), so that the thermistors, the generator and the battery must be made relatively large. The Applicant has proposed to fasten the heat sink, with insulation, in or on a contact carrier of plastics material and to arrange for the fastening means to act on the contact carrier and not on the heat sink. In this way the heat loss through the manifold is considerably reduced, but the use of a contact carrier with fastening and sealing arrangements makes this construction relatively expensive.

The arrangements described above also have other disadvantages: in comparison with manifolds not provided with heating means the design must be substantially modified and extensive re-machining of the manifold is necessary. The water circulation system for the manifold is rather substantially modified by the opening intended to receive the heating means. Since after the heating means has been switched off the water heated by the engine (temperature in the range between 80° and 98° C.) no longer maintains the heat sink at a determined temperature, there is the risk of the formation of a so-called "cold spot". Finally, known manifolds having a heating means fastened in an opening in the wall have the not inconsiderable disadvantage that on the loaded side adjoining the heat sink so much more heat is taken from the PTC material than on the opposite side that the loading of the PTC material, considered over its entire thickness, is fairly substantially asymmetrical, with a temperature peak on the unloaded side, so that the tempearture on the loaded side is relatively low and that only less heat than is required can be taken from that side.

The invention seeks to obviate these shortcomings and to provide an internal combustion engine of the kind first defined above, in which the heating means is installed, without a plastics contact carrier, without an opening in the wall of the manifold, and without modification of the water circulation system, in such a manner that the aforesaid temperature peak is moved more towards the middle of the thickness of the thermistor pellets.

According to the invention the heat sink is for this purpose held, with thermal insulation, in position inside a through passage through the action of clamp means which press the heat sink against the inside surface of said through passage.

Since the heating means is not fastened in a separate opening in the inlet manifold but on the inner wall of a through passage for the mixture (for example the inlet manifold), at the most a slight re-machining of the inner wall surface in question is required.

The clamping of the heat sink in the inlet manifold is primarily contemplated, although the installation of the heat sink in the suction pipe of a separate cylinder or in the outlet of a carburetor is easily possible. When the heat sink is disposed in the inlet manifold, it is inserted into the latter via a normal inlet or outlet opening for the mixture.

In order to conduct the electric current supply from the thermistor pellets to the insulated heat sink, the latter may be dish-shaped and may rest by its thickened or flanged peripheral edge on the bottom of the maniflod with the interposition of an electrically insulating member, while spring contact members are disposed between the thermistor pellets and the manifold.

In order to enable the heat sink to be easily clamped fast, it may be provided with a stump, over which a hollow ceramic pin is pushed. There are then two possible forms of clamp means: a spring strip acts on the top end of the ceramic pin and has its two ends inserted into the packing disposed on the edge of the mixture inlet opening of the manifold; or a strip is disposed rotatably on the top end of the hollow pin and the insulated ends of the strip are clamped under bosses on the manifold.

The electric supply line to the heat sink can pass through the hollow pin.

Turbulence can be promoted by disposing a piece of gauze on the ceramic pin in such a manner that the surface of the gauze extends substantially transversely in relation to the longitudinal axis of the pin.

The invention also relates to an inlet manifold clearly intended for the above described internal combustion engine.

The heat sink can be clamped fast in a fuel mixture through passage in a simple manner, for example in the induction pipe of the cylinder or in the outlet of a carburetor or in the inlet mouth of an inlet manifold, if the heat sink is in the form of a sleeve having one or more flat edges on which the thermistor pellets are fastened.

The invention will now be explained in greater detail with the aid of the drawings, in which examples of embodiments are illustrated.

Figure 1:
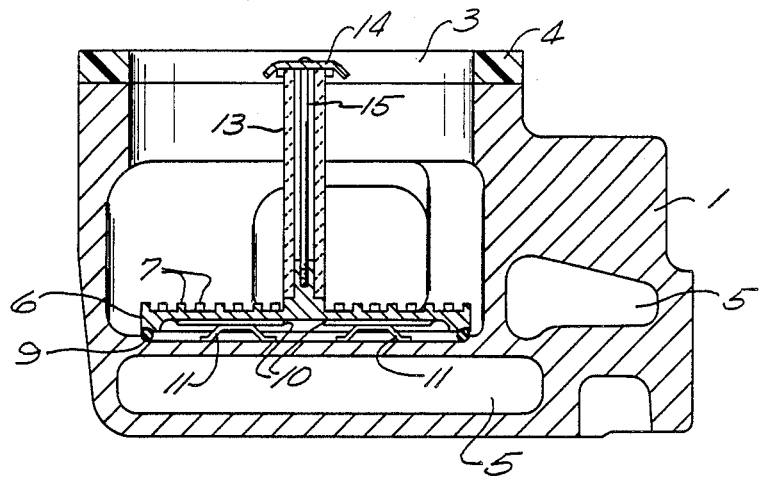
FIG. 1 is a section of an inlet manifold having a heating means according to a first embodiment of the invention.
Figure 2:
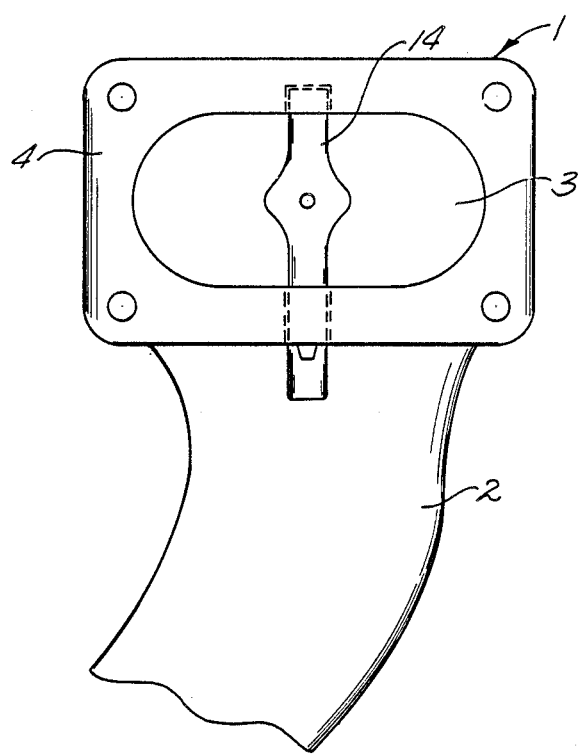
FIG. 2 is a top plan view of the manifold shown in FIG. 1.

Dimensions of certain of the parts as shown in the drawings may have been modified to illustrate the invention with more clarity.

Corresponding reference characters indicate corresponding parts throughout the several view of the drawings.

The inlet manifolds shown in FIGS. 1 to 4 are of customary shape and construction and comprise an inlet part 1 and a number of side branches 2, each leading to a cylinder. The inlet part 1 has an admission opening formed by edge 3 for the fuel mixture. On the edge 3 a carburetor (not shown) is intended to be fastened, while a packing 4 disposed on the edge 3 is clamped between the edge 3 and the carburetor. The manifold wall has circulation passages 5 for cooling water, which during operation is heated to a constant temperature, for example 95° C.

A heating device 6 having a pattern 7 on its top face is placed, via the opening 3, on the bottom of the inlet part 1. This part comprises a dish-shaped heat sink having a thickened or flanged edge 8, with the interposition of a member 9, which provides insulation in respect of both heat and electric current. A number of thermistor pellets or elements 10 composed of material having a positive temperature coefficient (PTC) of resistivity are fastened on the bottom face of the heat sink by means of an adhesive conducting heat and electricity.

Electrical conduction is established between the pellets 10 and the metal of the manifold by means of spring contact members 11.

The heat sink has a central stump 12, over which a hollow ceramic pin 13 is pushed. A clamp member is disposed on the top edge of the pin 13, this member consisting, in the embodiment illustrated in FIGS. 1 and 2, of a spring strip 14 whose ends are inserted into openings in the packing 4. The strip 14 presses the heating device clampingly against the bottom of the inlet part.

An electricity supply wire 15 connected to the heat sink extends through the hollow pin.

Figure 3:
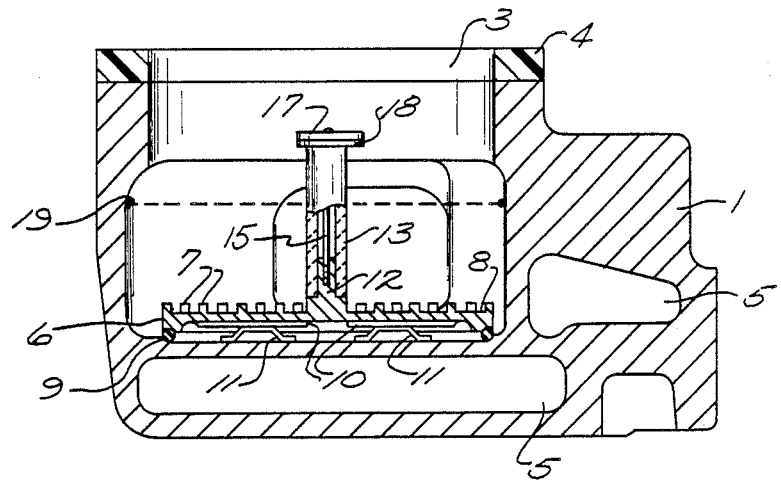
FIG. 3 is a section of an inlet manifold having a heating means according to a second embodiment.
Figure 4:
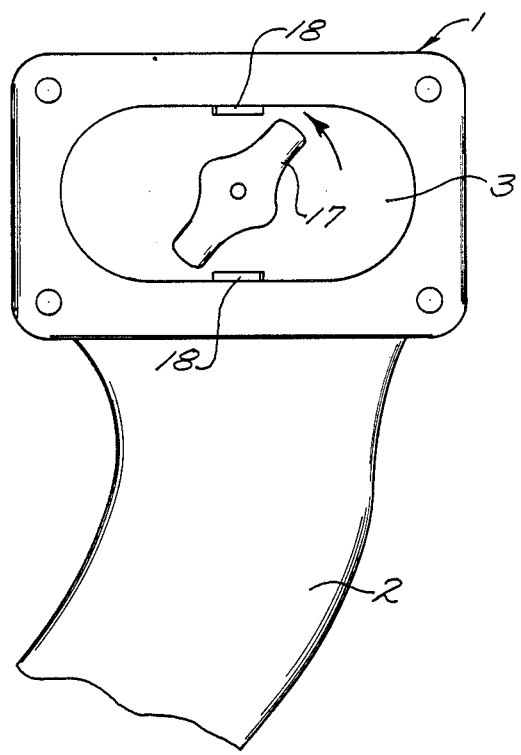
FIG. 4 is a top plan view of the arrangement shown in FIG. 3.

In the embodiment shown in FIGS. 3 and 4 a strip 17 is mounted rotatably on the ceramic pin, while bosses 18 are provided on the inside wall of the manifold 1 in mutually opposite positions.

When the strip 17 is turned in the direction of the arrow until the ends, which are provided with an insulating covering or the like, come to lie under the bosses, the heating device is clamped against the bottom of the inlet part 1 of the inlet manifold. In comparison with the embodiment shown in FIGS. 1 and 2 this embodiment has the disadvantage that the bosses form part of the manifold and must therefore be taken into account in the designing and casting of the manifold. In the embodiment shown in FIGS. 1 and 2 use may be made of a manifold of the usual known type, and at the most some re-machining may be required on the bottom part on which the heating device comes to lie. A piece of gauze shown as a dashed line 19 in FIG. 3 is fastened on the pin in order to promote turbulence in the mixture.

In addition, within the framework of the invention various other mechanisms may be used for holding in place the heating device, which is placed on the bottom of the manifold by way of the normal inlet opening for the fuel mixture. For example, electrically insulated spring snap means could be installed in the manifold to secure the heat sink.

Figure 5:
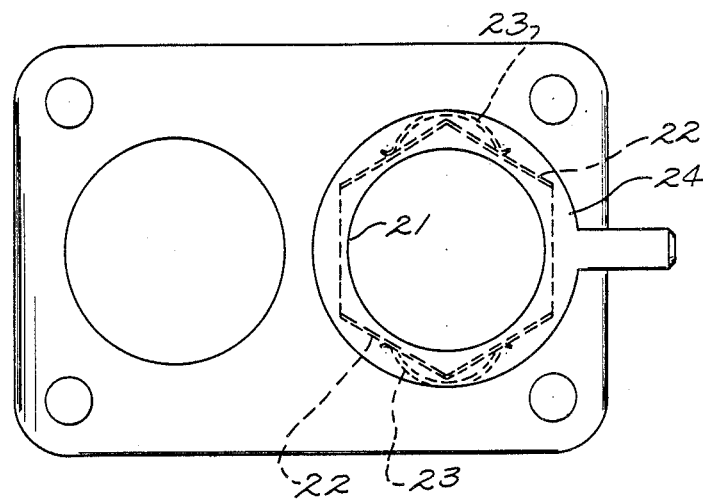
FIG. 5 is a top plan view of an inlet manifold having a heating means according to a third embodiment.
Figure 6:
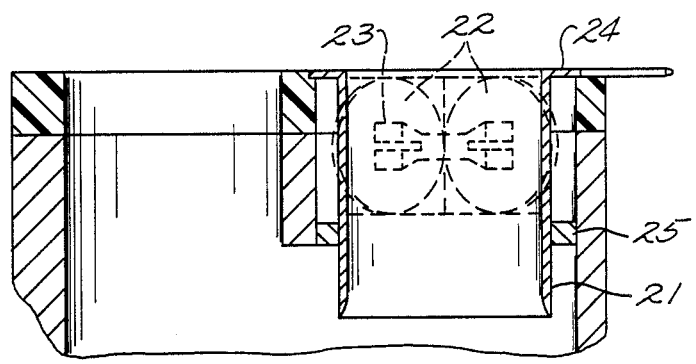
FIG. 6 is a section of the manifold shown in FIG. 5.

The manifold shown in FIGS. 5 and 6 is intended for a twin carburetor. One of the inlets is provided with a heating device consisting of a heat sink 21 in the form of a hexagonal sleeve and a number of thermistor pellets 22 secured by adhesive on a number of flat faces of the sleeve. The heating device is secured by two springs 23 in the respective inlet of the manifold. Current can be supplied via the lip 24. The pellets 22 are electrically connected to the frame (manifold) by springs 23. A thermally and electrically insulating ring 25 is disposed between the sleeve 21 and the walls of the manifold.

Figure 7:
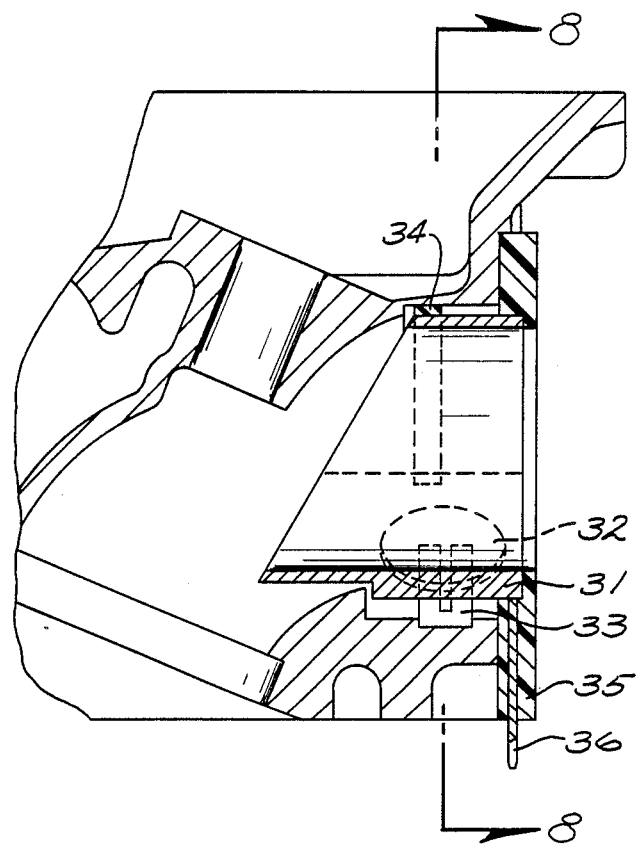
FIG. 7 is a longitudinal section of the head of a cylinder provided with a heating means according to a fourth embodiment.
Figure 8:
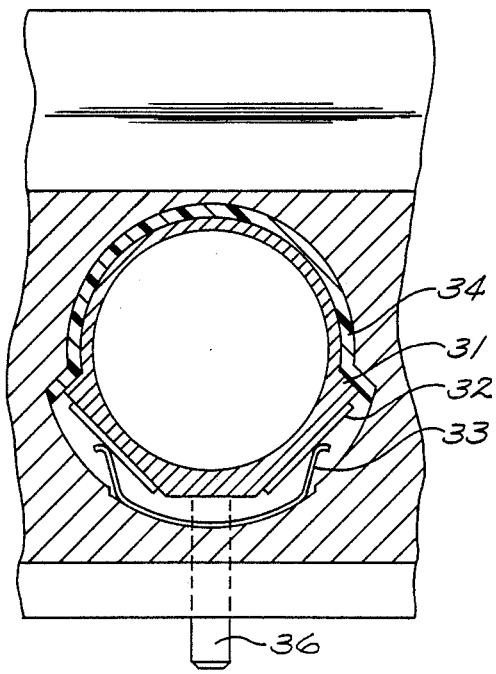
FIG. 8 is a section on the line 8—8 in FIG. 7.

FIGS. 7 and 8 show a head of one of the cylinders of an internal combustion engine, wherein a heating device is installed in the inlet to the cylinder, this device consisting of a heat sink 31 in the form of a tubular sleeve having approximately half of its outer periphery with respect to its radial axes semi-circular and two flat faces on the outer periphery of the remaining half on which thermistor pellets 32 are fastened by adhesive. This sleeve 31 is clamped fast by means of a spring 33, while a round strip 34 of insulating material maintains the desired spacing between the heat sink and the cylinder head. A flange 35 is fastened in the cylinder inlet. A metal lip 36 passing through the flange supplies current to the heat sink 31 via the spring 33. The pellets 32 are electrically connected to the cylinder head, which serves as a frame, by way of the spring 33.

It is an essential feature of the invention that in the wall of a through passage for the fuel mixture no separate opening is formed to receive the heating device, but that the latter is disposed in the interior of the through passage and is introduced into the latter via a normally provided inlet or outlet opening, and that the heating device is held in position by clamp means which can preferably be very easily brought into the clamping position. For the fastening and insulation of the heat sink no use is made of a complicated accessory of plastics material.

The water circulation system is not modified, that is to say in the embodiments shown in FIGS. 1 to 4 there is also water circulation directly under the heating device. During operation the water is at a temperature of about 95° C., and this relatively hot water ensures that after the current supply has been switched off to the thermistor pellets no "cold spot" will be formed at the site of the heat sink through the evaporating fuel and the consequent removal of heat from the environment.

Another important advantage is that, viewed over the thickness of the thermistor material, the situation of the highest temperature is approximately in the middle, so that the loaded side, that is to say the side face of the pellets which adjoins the heat sink, has a higher temperature than is the case, under the same conditions, with known through passages provided with heating devices. The fuel mixture can then also extract more heat from the thermistor pellets.

It should be understood that although particular embodiments of heating means for fuel mixtures of this invention have been described by way of illustrating the invention, the invention includes all modifications and equivalents of the disclosed embodiments falling within the scope of the appended claims.

What is claimed is:

1. An internal combustion engine provided with at least one heating means for heating a fuel mixture, which means comprises a metal disc (heat sink) on which one or more thermistor pellets made of material having a positive temperature coefficient (PTC) of resistivity are fastened, while means are provided for supplying electric current to said thermistor pellets and for taking off electric current from the latter, characterized in that the heat sink is held, with thermal insulation, in position inside a through passage for the fuel mixture through the action of clamp means which press the heat sink against the inside surface of said through passage, the heat sink being clamped fast inside the inlet manifold and introduced into the latter via a normal inlet or outlet opening for the mixture.

2. Internal combustion engine according to claim 1, characterized in that the heat sink is dish-shaped and rests by a thickened or flanged peripheral edge on the bottom of the manifold with the interposition of an electrically insulating member, and that spring contact members are disposed between the thermistor pellets and the manifold.

3. Internal combustion engine according to claim 1 characterized in that the heat sink is provided with a stump over which is pushed a hollow pin of electrically insulating material.

4. Internal combustion engine according to claim 3 characterized in that the top end of the hollow pin is acted on by a spring strip whose two ends are pushed into packing disposed on the edge of the mixture inlet of the manifold.

5. Internal combustion engine according to claim 3 characterized in that a strip having insulated opposite ends is mounted rotatably on the top end of the hollow pin and that the insulated ends of the strip are clamped under bosses on the manifold.

6. Internal combustion engine according to claim 3 characterized in that an electrical supply lead extends via the hollow pin to the heat sink.

7. Internal combustion engine according to claim 3 characterized in that a piece of gauze is fastened on the hollow pin in such manner that the plane of the gauze extends substantially transversely in relation to the longitudianl axis of the pin.

8. Heating apparatus adapted for use within an internal combustion engine for heating a fuel mixture within the inlet of each cylinder of the engine comprising a tubular heat sink having a portion approximately half of the outer periphery of which with respect to its radial axes being semi-circular and at least one flat portion formed on the outer periphery of the remaining half of the heat sink, a PTC heating element disposed on the flat portion, an electrically insulative strip, the heat sink disposed in the inlet with the semi-circular portion disposed in close thermal contact with a cylindrical portion of the cylinder inlet, the insulating strip disposed intermediate the heat sink and the inlet and spring means biasing the heat sink toward the cylindrical portion of the cylinder inlet to optimize the thermal coupling between inlet and the heat sink and being in electrical connection with the PTC element.

9. Heating apparatus according to claim 8 in which two flat portions are formed on the outer periphery of the remaining half of the heat sink and a PTC element is disposed on each flat portion.

10. Heating apparatus according to claim 9 in which the PTC elements are adhesively secured to the flat portions.

11. Heating apparatus for use within an internal combustion engine for heating a fuel mixture inside a passageway for the fuel mixture comprising a metal heat sink disc on which at least one thermistor pellet made of material having a positive temperature coefficient (PTC) of resistivety is fastened, means for supplying electric current to the pellet, clamp means disposed in the inlet manifold pressing the heat sink against the inside surface of the passageway, the heat sink introduced into the inlet manifold through a normal inlet or outlet opening for the fuel mixture.

12. Internal combustion engine according to claim 11 in which the heat sink is dish-shaped and rests by a thickened or flanged peripheral edge on the bottom of the manifold with the interposition of an electrically insulating member, and that spring contact members are disposed between the thermistor pellets and the manifold.

13. Internal combustion engine according to claim 11 in which the heat sink is provided with a stump over which is pushed a hollow pin of electrically insulating material.

14. Internal combustion engine according to claim 13 in which the top end of the hollow pin is acted on by a spring strip whose two ends are pushed into packing disposed on the edge of the mixture inlet of the manifold.

15. Internal combustion engine according to claim 13 in which a strip having insulated opposite ends is mounted rotatably on the top end of the hollow pin and that the insulated ends of the strip are clamped under bosses on the manifold.

16. Internal combustion engine according to claim 13 in which an electrical supply lead extends via the hollow pin to the heat sink.

17. Internal combustion engine according to claim 13 in which a piece of gauze is fastened on the hollow pin in such a manner that the plane of the gauze extends substantially transversely in relation to the longitudinal axis of the pin.

* * * * *